Oct. 24, 1939.  D. D. AREHART  2,176,878
TRAILER DRAFT RIGGING
Filed June 21, 1937
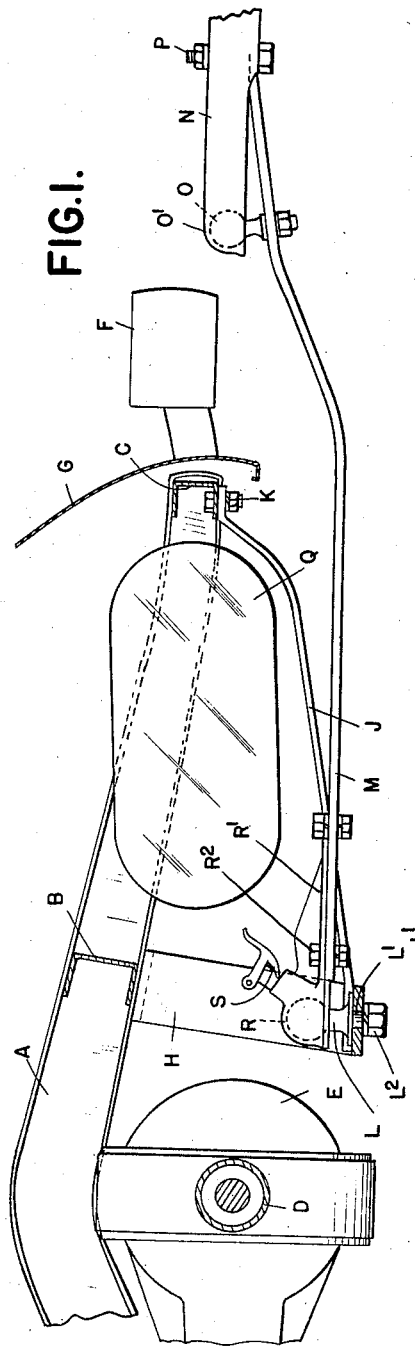
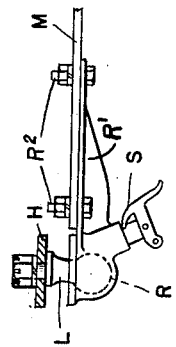
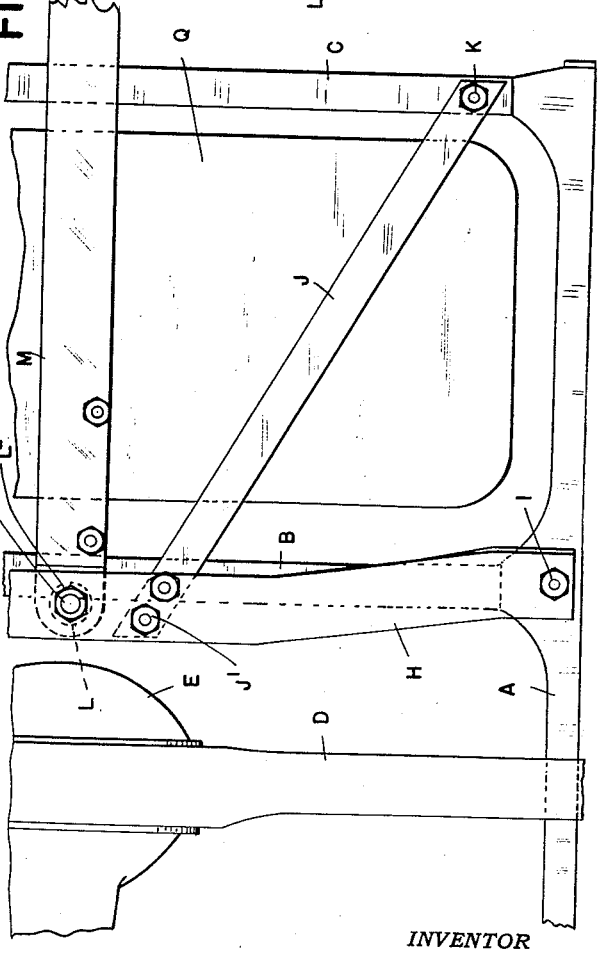
INVENTOR
DAVID D. AREHART
BY
Whittemore Hulbert & Belknap
ATTORNEYS Patented Oct. 24, 1939

2,176,878

UNITED STATES PATENT OFFICE 2,176,878

TRAILER DRAFT RIGGING

David D. Arehart, Flint, Mich., assignor to Palace Travel Coach Corporation, Flint, Mich., a corporation of Michigan Application June 21, 1937, Serial No. 149,498

4 Claims. (Cl. 280—33.44)

The invention relates to draft riggings for attaching trailers to automobiles and it is the object of the invention to obtain a construction which is free from certain defects in such draft riggings as heretofore used. To this end the invention consists in the construction as hereinafter set forth.

In the drawing:

Figure 1 is a longitudinal section through the rear portion of an automobile showing my improved draft rigging as applied thereto;

Figure 2 is a half bottom plan view;

Figure 3 is a sectional side elevation showing a modified construction.

In the design of automobiles it is customary to have the frame and body extend a considerable distance in rear of the driving axle and with the protecting bumper still farther to the rear. Where a trailer draft rigging is attached it is usual to form the pivotal connection in rear of the frame and bumper which has the effect when the automobile is turned, of swinging this pivot in the opposite direction. This is for the reason that the center of turning is in the plane of the driving axle so that the lateral deflection is increased in proportion to the distance of the pivot in rear of this plane. The lateral oscillation of the pivot will communicate an oscillatory movement to the trailer which is highly objectionable.

To avoid the difficulty just described I have devised a construction in which the pivotal connection of the draft bar is located in close proximity to the rear axle where the amount of lateral deflection is comparatively slight. To avoid interference with various parts of the automobile, such for instance as the gas tank, I have provided a frame which can be readily attached to the chassis frame and which has a depending portion for supporting the pivotal connection slightly in rear of the axle housing and substantially at the center thereof. The pivotal connection is thus at a low enough point so that the draft bar can pass beneath the gas tank or other obstructing part of the automobile. As automobile trailer draft riggings are usually designed for attachment in rear of the automobile I have provided an extension draft bar which may be easily attached to the trailer draft bar and is adapted to pass beneath the tank and other obstructions to the pivotal point adjacent to the axle.

In detail, A is a side sill of the chassis frame of an automobile and B and C cross bars of said frame which are in rear of the driving axle D. This driving axle is provided at the center thereof with the usual differential gearing housing E which is the portion of the car having the least clearance above the road bed. F is a bumper which is secured to the frame in rear of the body G. My improved draft rigging comprises a member H, preferably formed of a flat metallic bar which at its opposite ends is bolted or otherwise attached at I to the side sill of the chassis. The central portion of this bar is bowed downward so as to be only slightly above the lowest point in the differential housing E. To impart rigidity to the bar H brace members J are attached thereto at points J' near but on opposite sides of the center of the bar and extend diagonally therefrom to the rear cross bar C to which they are attached at K. At the center of the bar H is mounted a ball pivot L which has a threaded shank L' passing through an aperture in the bar and secured by a clamping nut L². M is an extension draft bar which is attachable to the regular draft bar N of the trailer draft rigging, not further illustrated. This regular draft rigging usually includes a ball pivot O for attachment to the bumper or other part of the automobile frame and a ball socket O' at the end of the bar N for engagement with this pivot. I, therefore, preferably utilize these parts for attachment of the extension draft bar M, first attaching the pivot O to this bar and engaging the ball thereof with the socket O', and then clamping the rear end of the bar by a bolt P to the regular draft bar N. This not only forms a firm attachment between the bars M and N, but also inclines the former downward so that it can pass beneath the gas tank Q. At the forward end of the bar M is attached a socket member R for engagement with the ball pivot L, this socket being preferably provided with a locking mechanism for holding it in engagement with the pivot as indicated at S. However, the specific construction of this socket member and locking mechanism forms no part of the present invention and it is therefore not illustrated in detail. As shown, the socket member has a shank portion R' which is secured by bolts R² to the bar M.

With the construction as described, to attach the draft rigging to an automobile it is only necessary to drill bolt holes in the chassis frame for receiving the bolts I and K and then clamping the auxiliary frame in position by said bolts. The extension draft bar M will then extend rearward from the pivot L and may be readily attached to the draft bar N by the ball pivot O and bolt P, as previously described. When thus attached, the draft bar of the trailer extends to the pivot L which being located close to the axle D will have but comparatively slight lateral deflection during the turning of the car.

In some constructions of automobiles there may be further obstructions, such for instance as the exhaust pipe which might interfere with the free swinging of the bar M, when in the position indicated in Figure 1. For such constructions the pivot L may be reversed in position so as to extend downward from the bar H, as indicated in Figure 3. This will drop the bar M to a lower point so as to clear all obstructions.

What I claim as my invention is:

1. The combination with a motor vehicle having a driving axle with a differential gear housing at the center thereof and a chassis frame extending in rear of said axle and housing, of a trailer draft rigging attachment comprising a bar having its opposite ends attached to the opposite sides of said chassis frame and bowed downward to have its central portion located slightly in rear and slightly above the lowest point in said differential gearing housing, a brace member extending from this downwardly bowed portion to the rear of the chassis frame, a pivot secured to said bar centrally thereof, and an extension draft bar having its forward end engaging said pivot and extending therefrom to a point in rear of the chassis frame for attachment to the trailer draft rigging.

2. The combination with a motor vehicle having a driving axle with a differential gearing housing located at the center thereof, a chassis frame extending in rear of said axle, and a gas tank supported on the rearwardly extending portion of said chassis frame, of a trailer draft rigging attachment comprising a bar having its opposite ends secured to the opposite sides of said chassis frame and bowed downwardly to have its central portion located slightly in rear of the lower portion of said differential housing, diagonal brace bars extending from the central portion of said bowed bar to the rear portion of said chassis frame and secured thereto, said brace bars being fashioned to clear said gas tank, a pivot secured centrally of said bar, and an extension draft bar having its forward end engaging said pivot and extending therefrom beneath said tank to a point in rear of said chassis frame for attachment to the trailer draft rigging.

3. The combination with a motor vehicle having a driving axle with a differential gearing housing at the center thereof, a chassis frame extending in rear of said axle and a gas tank supported by the rearwardly extending portion of said chassis frame, of a trailer draft rigging attachment comprising a bar having its opposite ends secured to the opposite side of said chassis frame, and a central portion bowed downward to a point slightly in rear of the lower portion of said differential housing, a ball pivot centrally mounted on said downwardly bowed portion, an extension draft bar having its forward end engaging said ball pivot and extending therefrom beneath said gas tank to a point in rear of the chassis frame, a ball pivot secured to the rear portion of said auxiliary draft bar and engaged with a cooperating socket in the trailer draft rigging, and a clamping bolt for further attaching said extension draft bar to the draft bar of said trailer draft rigging.

4. The combination with a motor vehicle having a driving axle with a differential gearing housing at the center thereof, a chassis frame extending in rear of said axle and a gas tank mounted on the rearward extension of said chassis frame, of a trailer draft rigging attachment comprising a bar having its opposite ends secured to the opposite sides of said chassis frame and centrally bowed downward having a portion located slightly in rear of the lower portion of said differential gearing housing, brace bars extending from said downwardly bowed central portion to the rear of said chassis frame and curved to clear the gas tank, a ball pivot attachable to the central bowed portion of said bar to alternatively extend upward or downward therefrom, an extension draft bar having a socket fitting secured to its forward end and engageable with said ball pivot in either of its locations, said draft bar extending rearward beneath said gas tank to a point in rear of said chassis frame, and means for detachably connecting the rear end of said extension draft bar to the draft bar of the trailer draft rigging.

DAVID D. AREHART.